United States Patent
Nandagopal et al.

(10) Patent No.: US 10,927,439 B2
(45) Date of Patent: Feb. 23, 2021

(54) STAINLESS STEEL ALLOYS, TURBOCHARGER COMPONENTS FORMED FROM THE STAINLESS STEEL ALLOYS, AND METHODS FOR MANUFACTURING THE SAME

(71) Applicant: Garrett Transportation I Inc., Torrance, CA (US)

(72) Inventors: Balasubramani Nandagopal, Karnataka (IN); Marc Wilson, Deyvillers (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 193 days.

(21) Appl. No.: 15/992,263

(22) Filed: May 30, 2018

(65) Prior Publication Data

US 2019/0368017 A1  Dec. 5, 2019

(51) Int. Cl.
| | |
|---|---|
| C22C 38/58 | (2006.01) |
| C22C 38/00 | (2006.01) |
| C22C 38/02 | (2006.01) |
| C22C 38/48 | (2006.01) |
| F01D 25/00 | (2006.01) |
| F01D 25/30 | (2006.01) |

(52) U.S. Cl.
CPC ............ *C22C 38/58* (2013.01); *C22C 38/001* (2013.01); *C22C 38/002* (2013.01); *C22C 38/02* (2013.01); *C22C 38/48* (2013.01); *F01D 25/005* (2013.01); *F01D 25/30* (2013.01); *F05D 2220/40* (2013.01); *F05D 2230/21* (2013.01); *F05D 2240/14* (2013.01); *F05D 2300/171* (2013.01)

(58) Field of Classification Search
CPC .............................. C22C 38/58; H01D 25/30
USPC .......................................................... 420/48
See application file for complete search history.

(56) References Cited

U.S. PATENT DOCUMENTS

| | | | |
|---|---|---|---|
| 4,929,419 A | * | 5/1990 | Wegman ................. C22C 38/58 148/326 |
| 8,137,613 B2 | | 3/2012 | Osuki et al. |

(Continued)

FOREIGN PATENT DOCUMENTS

| | | |
|---|---|---|
| CN | 104593692 A | 5/2015 |
| EP | 0467756 A1 | 1/1992 |
| EP | 1228253 A1 | 8/2002 |

(Continued)

OTHER PUBLICATIONS

MatWeb Material Property Data; Overview of materials for Austenitic; Retrived from Internet: [[http://www.matweb.com/search/DataSheet.aspx?MatGUID=cefecc69eca4419491a8ce46d . . . ]] Copyright 1996-2018 by MatWeb, LLC.

(Continued)

*Primary Examiner* — Weiping Zhu
(74) *Attorney, Agent, or Firm* — Lorenz & Kopf, LLP

(57) ABSTRACT

Disclosed is an austenitic stainless steel alloy that includes or consists of, by weight, about 24% to about 26% chromium, about 11% to about 13% nickel, about 4.5% to about 5.5% manganese, about 1.3% to about 1.7% silicon, about 1.2% to about 1.6% niobium, about 0.40% to about 0.50% carbon, about 0.2% to about 0.4% nitrogen, and a balance of iron with inevitable/unavoidable impurities. The alloy is suitable for use in turbocharger turbine applications for temperatures up to about 1050° C.

20 Claims, 4 Drawing Sheets

(56) References Cited

U.S. PATENT DOCUMENTS

| | | |
|---|---|---|
| 8,287,805 B2 | 10/2012 | Sjodin |
| 2016/0032434 A1 | 2/2016 | Inoue et al. |

FOREIGN PATENT DOCUMENTS

| | | |
|---|---|---|
| GB | 737002 | 10/1952 |
| JP | 2004269979 A | 9/2004 |
| JP | 2014047420 A | 3/2014 |
| WO | 2010036533 A2 | 4/2010 |
| WO | 2016117731 A1 | 7/2016 |

OTHER PUBLICATIONS

MatWeb Material Property Data; Overview of material for Cast Stainless Steel; Retrived from Internet: [[http://www.matweb.com/search/DataSheet.aspx?MatGUID=dc78ba5a80e347d182805eeb0 . . . ]] Copyright 1996-2018 by MatWeb, LLC.

MatWeb Material Property Data; Overview of material for T300 Serias Stainless Steel; Retrived from Internet: [[http://www.matweb.com/search/DataSheet.aspx?MatGUID=7a87941825a3463eaba7979c4 . . . ]] Copyright 1996-2018 by MatWeb, LLC.

\* cited by examiner

STAINLESS STEEL ALLOYS, TURBOCHARGER COMPONENTS FORMED FROM THE STAINLESS STEEL ALLOYS, AND METHODS FOR MANUFACTURING THE SAME

TECHNICAL FIELD

The present disclosure generally relates to stainless steel alloys. More particularly, the present disclosure relates to stainless steel alloys used for casting applications, for example turbine and turbocharger housings, exhaust manifolds, and combustion chambers, which exhibit oxidation resistance at elevated temperatures, and methods for manufacturing the same.

BACKGROUND

During operation, automotive or aircraft turbocharger components are subjected to elevated operating temperatures. These components must be able to contain a turbine wheel generating very high rotational speeds. Exhaust gas from the automotive or aircraft engine initially contacts the turbocharger in metal sections, such as the gas inlet area of the turbocharger, at elevated temperatures. As high-speed performance improves through exhaust temperature increase, there have been attempts to gradually raise the exhaust temperature of the engine. Due to these high temperatures, the thermal load on the parts such as the exhaust manifold and the turbine housing becomes very great.

Various problems have been encountered by these increased exhaust gas temperatures contacting metal sections of the turbocharger. For example, one problem caused by the exhaust temperature rise is the problem of thermal deformation of the material. The turbine housing and exhaust manifold, which alternate between regions of high temperature and low temperature, experience thermal expansion and thermal shrinkage depending on the situation. These thermal stresses can cause surface deformations or "wrinkles", which can progress and develop into a penetration crack.

In order to overcome the challenges associated with higher operating temperatures, prior art alloys used in turbocharger applications have included alloys of higher nickel content, such as commercially available high nickel ductile iron casting alloys. As used herein, the term operating temperature refers to the maximum temperature of exhaust gas designed to be experienced by the turbine housing and blade components of the turbocharger. Stainless steel alloys of the 1.48XX series, such as stainless steel 1.4848, are well-known in the art. Having a specification for nickel between 19% and 22%, they are exemplary prior art materials for turbine housing applications between 1000° C.-1020° C. While meeting the high temperature property requirements for turbocharger housings, stainless steel 1.4848 is quite expensive because of its high nickel content. Further, due to the sudden rise of the Ni price recently, there has been substantial concern over the cost of materials that have a high nickel content.

Alternatively, K273 with lower nickel content can be used for housing temperatures up to 1020° C. However, due to a higher carbon content, K273 poses manufacturing concerns in terms of machinability. Also, laboratory oxidation tests indicated lower oxidation resistance of K273 in comparison with other stainless steels recommended for such high temperature applications. TABLE 1, set forth below, provides the specifications for stainless steels 1.4848 and K273, in wt.-%.

TABLE 1

| Composition of K273 and 1.4848 Stainless Steels | | | | |
|---|---|---|---|---|
| | K273 | | 1.4848 | |
| Elements | MM (%) | Max (%) | MM (%) | Max (%) |
| Carbon | 0.75 | 0.9 | 0.3 | 0.5 |
| Silicon | 0.3 | 1 | 1 | 2.5 |
| Chromium | 18 | 21 | 23 | 27 |
| Nickel | 4.5 | 5.5 | 19 | 22 |
| Molybdenum | 0.8 | 1.2 | 0 | 0.5 |
| Manganese | 4.5 | 5.5 | 0 | 2 |
| Tungsten | 0.8 | 1.2 | — | — |
| Niobium | 0.65 | 0.8 | 0 | 1.6 |
| Phosphorous | 0 | 0.02 | 0 | 0.04 |
| Sulphur | 0 | 0.02 | 0 | 0.04 |
| Nitrogen | 0.2 | 0.4 | — | — |
| Iron | Balance | | Balance | |

Thus, material with less machining issues and better oxidation resistance will be a suitable alternative to the available options. Accordingly, there is a need for stainless steel alloys useful in turbocharger applications that are able to withstand the higher operating temperatures produced by modern engines, but that minimize the expensive nickel content. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Stainless steel alloys, turbocharger turbine components, and methods of manufacturing turbocharger turbine components are provided.

In an embodiment, by way of example only, an austenitic stainless steel alloy includes or consists of, by weight, about 24% to about 26% chromium, about 11% to about 13% nickel, about 4.5% to about 5.5% manganese, about 1.3% to about 1.7% silicon, about 1.2% to about 1.6% niobium, about 0.40% to about 0.50% carbon, about 0.2% to about 0.4% nitrogen, and a balance of iron with inevitable/unavoidable impurities. As a variation to the foregoing embodiment, the alloy may include or consist of chromium in an amount of about 24.5% to about 25.5%. As a variation to any of the foregoing embodiments, the alloy may include or consist of nickel in an amount of about 11.5% to about 12.5%. As a variation to any of the foregoing embodiments, the alloy may include or consist of manganese in an amount of about 4.8% to about 5.2%. As a variation to any of the foregoing embodiment, the alloy may include or consist of silicon in an amount of about 1.4% to about 1.6%. As a variation to any of the foregoing embodiments, the alloy may include or consist of niobium in an amount of about 1.3% to about 1.5%. As a variation to any of the foregoing embodiments, the alloy may include or consist of carbon in an amount of about 0.43% to about 0.47%. As a variation to any of the foregoing embodiment, the alloy may include or consists of nitrogen in an amount of about 0.25% to about 0.35%.

In another embodiment, by way of example only, a turbocharger turbine housing includes an austenitic stainless steel alloy that includes or consists of, by weight, about 24% to about 26% chromium, about 11% to about 13% nickel, about 4.5% to about 5.5% manganese, about 1.3% to about 1.7% silicon, about 1.2% to about 1.6% niobium, about 0.40% to about 0.50% carbon, about 0.2% to about 0.4% nitrogen, and a balance of iron with inevitable/unavoidable impurities. As a variation to the foregoing embodiment, the alloy may include or consist of chromium in an amount of about 24.5% to about 25.5%. As a variation to any of the foregoing embodiments, the alloy may include or consist of nickel in an amount of about 11.5% to about 12.5%. As a variation to any of the foregoing embodiments, the alloy may include or consist of manganese in an amount of about 4.8% to about 5.2%. As a variation to any of the foregoing embodiment, the alloy may include or consist of silicon in an amount of about 1.4% to about 1.6%. As a variation to any of the foregoing embodiments, the alloy may include or consist of niobium in an amount of about 1.3% to about 1.5%. As a variation to any of the foregoing embodiments, the alloy may include or consist of carbon in an amount of about 0.43% to about 0.47%. As a variation to any of the foregoing embodiment, the alloy may include or consists of nitrogen in an amount of about 0.25% to about 0.35%.

In yet another embodiment, a method of fabricating a turbocharger turbine housing include forming the turbocharger turbine housing from an austenitic stainless steel alloy that includes or consists of, by weight, about 24% to about 26% chromium, about 11% to about 13% nickel, about 4.5% to about 5.5% manganese, about 1.3% to about 1.7% silicon, about 1.2% to about 1.6% niobium, about 0.40% to about 0.50% carbon, about 0.2% to about 0.4% nitrogen, and a balance of iron with inevitable/unavoidable impurities. As a variation to the foregoing embodiment, the alloy may include or consist of chromium in an amount of about 24.5% to about 25.5%. As a variation to any of the foregoing embodiments, the alloy may include or consist of nickel in an amount of about 11.5% to about 12.5%. As a variation to any of the foregoing embodiments, the alloy may include or consist of manganese in an amount of about 4.8% to about 5.2%. As a variation to any of the foregoing embodiment, the alloy may include or consist of silicon in an amount of about 1.4% to about 1.6%. As a variation to any of the foregoing embodiments, the alloy may include or consist of niobium in an amount of about 1.3% to about 1.5%. As a variation to any of the foregoing embodiments, the alloy may include or consist of carbon in an amount of about 0.43% to about 0.47%. As a variation to any of the foregoing embodiment, the alloy may include or consists of nitrogen in an amount of about 0.25% to about 0.35%.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

Figure 1:
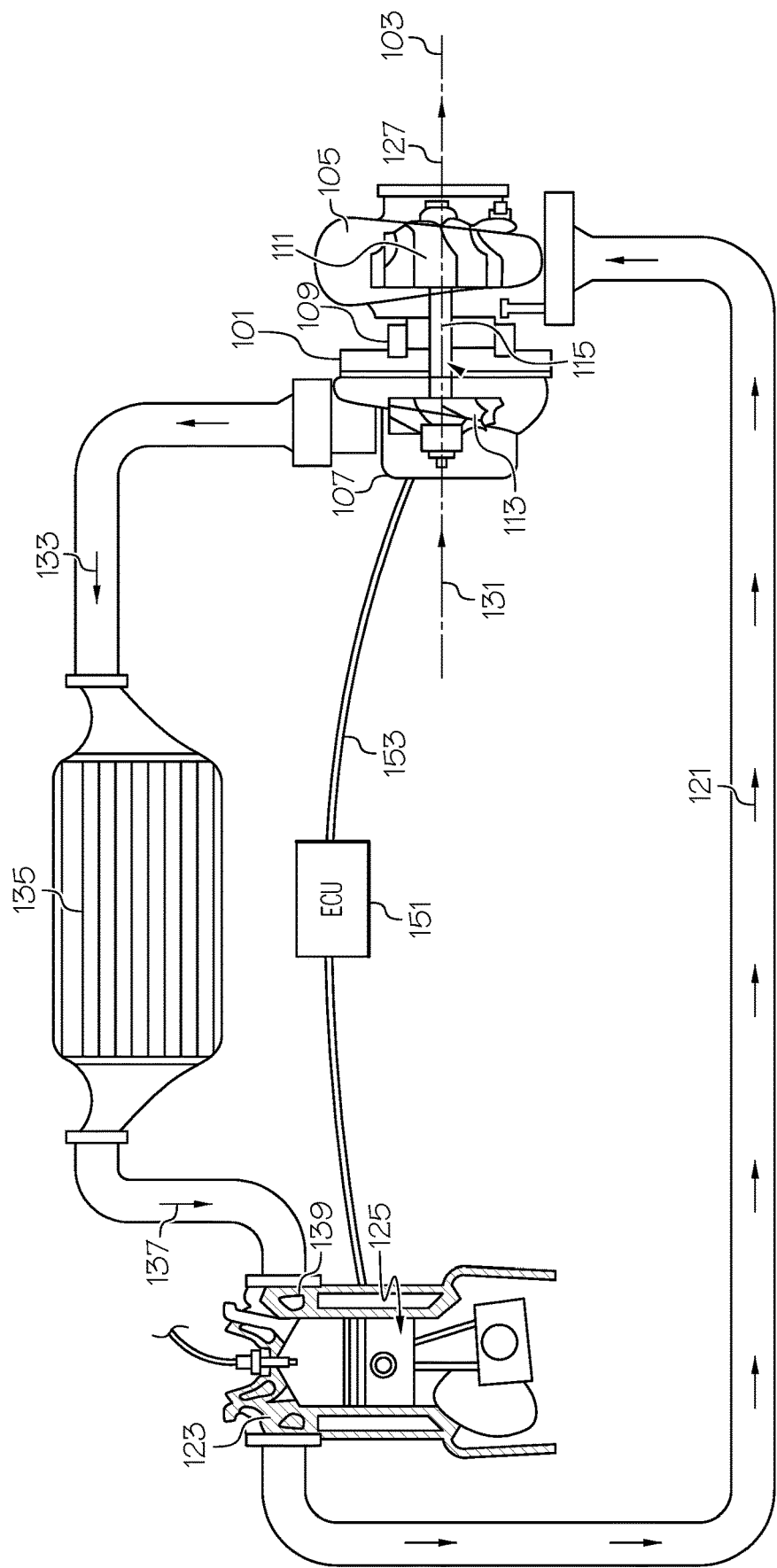
FIG. 1 is a system view of an embodiment of a turbocharged internal combustion engine in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. Still further, the term "about" is used herein to imply a variance in the stated compositional percentage by +/−10% on a relative basis, or by +/−5% on a relative basis. Of course, any compositional percentage used with the term "about" may also be understood to include the exact compositional percentage as stated, in some embodiments.

All of the embodiments and implementations of the stainless steel alloys, turbocharger turbine components, and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure generally relates to austenitic stainless steel alloys suitable for use in various turbocharger turbine and exhaust applications. Exemplary turbocharger turbine components in accordance with the present disclosure include turbine housing components and turbine exhaust components, which are subject to operating temperatures up to about 1050° C. The turbocharger turbine housing, usually a cast stainless steel or cast iron, is often the most expensive component of the turbocharger. Reduction in cost of the housing will have a direct effect on the cost of the turbocharger. In order to withstand the high operating temperatures commonly produced by exhaust gasses impinging on the turbine housing, turbine housing materials are usually alloyed with elements such as chromium and nickel in addition to other carbide forming elements, resulting in increased cost. Reducing the content and/or eliminating these expensive alloying elements will have a direct effect on the cost of the turbine housing.

Typical embodiments of the present disclosure reside in a vehicle, such as an land-, air-, or water-operating vehicle, equipped with a powered internal combustion engine ("ICE") and a turbocharger. The turbocharger is equipped with a unique combination of features that may, in various embodiments, provide efficiency benefits by relatively limiting the amount of (and kinetic energy of) secondary flow in the turbine and/or compressor, as compared to a comparable unimproved system.

With reference to FIG. 1, an exemplary embodiment of a turbocharger 101 having a radial turbine and a radial compressor includes a turbocharger housing and a rotor configured to rotate within the turbocharger housing around an axis of rotor rotation 103 during turbocharger operation on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a radial turbine wheel 111 located substantially within the turbine housing 105, a radial compressor wheel 113 located substantially within the compressor housing 107, and a shaft 115 extending along the axis of rotor rotation 103, through the bearing housing 109, to connect the turbine wheel 111 to the compressor wheel 113.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel 111 (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

Embodiments of the present disclosure are directed to improvements over the currently available stainless steel alloys for use in turbochargers having operating temperatures up to about 1050° C. In particular, embodiments of the present disclosure are directed to austenitic stainless steel alloys that have a nickel content that is less than stainless steel 1.4848 for cost considerations, and better machinability than K273 for manufacturing considerations. The stainless steel alloys described herein include iron alloyed with various alloying elements, as are described in greater detail below in weight percentages based on the total weight of the alloy. Moreover, the discussion of the effects and inclusion of certain percentages of elements is particular to the inventive alloy described herein.

In an embodiment, the austenitic stainless steel alloy of the present disclosure includes or consists of from about 24% to about 26% chromium (Cr), for example about 24.5% to about 25.5% Cr, such as about 25% Cr. On the other hand, if it is added excessively, coarse primary carbides of Cr are formed, resulting in extreme brittleness. When the content of Cr increases, the corrosion resistance increases, but the content of expensive Ni should be also increased to maintain the volume fraction. As such, the content of Cr is preferably limited to a maximum of about 26% so as to maintain the volume fraction of the stainless steel and the corrosion resistance.

In an embodiment, the austenitic stainless steel alloy of the present disclosure includes or consists of from about 11% to about 13% nickel (Ni), for example about 11.5% to about 12.5% Ni, such as about 12% Ni. Ni, together with manganese and nitrogen (which as described in greater detail below are included in the alloy of the present disclosure), is an element to stabilize the austenite phase. To reduce a production cost, if the content of expensive Ni is lowered, the decrement of Ni can be replaced by increasing the content of manganese and nitrogen that form the austenite phase. However, if the content of Ni is excessively lowered, manganese and nitrogen would be excessively needed so that the corrosion resistance and the hot formability characteristics are deteriorated. Thus, the content of Ni preferably ranges from about 11% to about 13%.

In an embodiment, the austenitic stainless steel alloy of the present disclosure includes or consists of from about 4.5% to about 5.5% manganese (Mn), for example about 4.8% to about 5.2% Mn, such as about 5.0% Mn. Mn is effective like Si as a deoxidizer for the melt, and has a function of improving the fluidity during the casting operation. To exhibit such function effectively, the amount of Mn is about 5.5% or less, preferably about 5.0%. Mn generally has a content of greater than about 4.5% to adjust a metal flow rate. However, when the content of Mn is excessive, Mn is combined with sulfur of the steel and forms excessive levels of manganese sulfide, thereby deteriorating the corrosion resistance and the hot formability. Thus, the upper limit content of Mn is limited to 5.5%.

In an embodiment, the austenitic stainless steel alloy of the present disclosure includes or consists of from about 1.2% to about 1.6% niobium (Nb), for example about 1.3% to about 1.5% Nb, such as about 1.4% Nb. The heat-resistant, steel of the present disclosure is provided with a high castability by forming eutectic carbides of Nb as well as a high strength and ductility.

In an embodiment, the austenitic stainless steel alloy of the present disclosure includes or consists of from about 1.3% to about 1.7% silicon (Si), for example about 1.4% to about 1.6% Si, such as about 1.5% Si. Si has effects of increasing the stability of its metal structure and its oxidation resistance. Further, it has a function as a deoxidizer and also is effective for improving castability and reducing pin holes in the resulting cast products, when present in an amount greater than about 1.3%. If the content of Si is excessive, Si deteriorates the mechanical property such as impact toughness of steel. Therefore, the content of Si is preferably limited to about 1.7% and below.

In an embodiment, the austenitic stainless steel alloy of the present disclosure includes or consists of from about 0.40% to about 0.50% carbon (C), for example about 0.43% to about 0.47% C, such as about 0.45% C. C has a function of improving the fluidity and castability of a melt. C also has a function of improving the castability by forming eutectic carbide with niobium (which, as discussed in greater detail below, is included in the alloy). To exhibit such functions effectively, the amount of C should be 0.40% or more. Further, C is effective for strengthening a material by solid solution strengthening. To maximize the corrosion resistance, the content of C is lowered into about 0.50% and below.

Nitrogen (N) is an element capable of improving the high-temperature strength and the thermal fatigue resistance like C, and such effects can be obtained when the amount of N is 0.2% or more. Accordingly, in an embodiment, the austenitic stainless steel alloy includes or consists of from about 0.2% to about 0.4% N, for example from about 0.25% to about 0.35% N, such as about 0.30% N. To ensure the production stability and to avoid the brittleness due to the precipitation of Cr nitrides, the upper limit of N should be about 0.4%. N, together with Ni, is one of elements that contribute stabilization of an austenite phase. As the content of N increases, the corrosion resistance and high strengthening are achieved. However, when the content of N is too high, the hot formability of steel is deteriorated, thereby lowering the production yield thereof. Therefore, the content of N preferably ranges up to a maximum of about 0.4%.

Certain impurities may also be present in the austenitic stainless steel alloy of the present disclosure. The amounts of such impurities are minimized as much as practical. In an embodiment, phosphorus (P) may be present in the alloy, but is minimized to about 0.02% or less, and is preferably minimized to about 0.01% or less. P is seeded in the grain boundary or an interface, and is likely to deteriorate the corrosion resistance and toughness. Therefore, the content of P is lowered as low as possible. Preferably, the upper limit content of P is limited to 0.02% in consideration of the efficiency of a refining process. The contents of harmful impurities, such as P are as small as possible, such as 0.01% or less.

In an embodiment, sulfur (S) may be present in the alloy, but is minimized to about 0.02% or less, and is preferably minimized to about 0.01% or less. S in steels deteriorates hot workability and can form sulfide inclusions that influence pitting corrosion resistance negatively. It should therefore be limited to less than 0.02%. S deteriorates the hot formability, or forms MnS together with Mn, thereby deteriorating the corrosion resistance. Therefore, the content of S is lowered as low as possible. The contents of harmful impurities, such as S (sulfur), are as small as possible, such as 0.01% or less.

Boron (B), calcium (Ca), and cerium (Ce) can optionally be added in very small quantities in steels to improve hot workability. The preferred levels are for B, Ca, and Ce each (individually) are less than about 0.01%, such as less than about 0.005%. In other embodiments, 0% of any or all of the foregoing three optional elements (B, Ca, Ce) may be included in the alloy.

The disclosed alloy may comprise the foregoing elements, in that other elements may be included in the alloy composition within the scope of the present disclosure. Preferably, however, the disclosed alloy consists of the foregoing elements, in that other elements beyond those described above are not included in the alloy (in greater than investable/unavoidable impurity amounts). Specific elements that may be excluded from the alloy (in greater than impurity amounts) include one or more of aluminum, titanium, vanadium, tungsten, molybdenum, cobalt, and/or copper, and any combination of two or more thereof may be excluded.

TABLE 2 sets forth the composition of an exemplary embodiment of austenitic stainless steel alloy the present disclosure, in accordance with an embodiment of the description provided above (all elements in wt.-%).

TABLE 2

Composition of the Stainless Steel Alloy

| Elements | Min (Wt.-%) | Max (Wt.-%) |
| --- | --- | --- |
| Chromium | 24 | 26 |
| Nickel | 11 | 13 |
| Manganese | 4.5 | 5.5 |
| Niobium | 1.2 | 1.6 |
| Silicon | 1.3 | 1.7 |
| Carbon | 0.4 | 0.5 |
| Nitrogen | 0.2 | 0.4 |
| Sulphur | 0 | 0.02 |
| Phosphorous | 0 | 0.02 |
| Boron | 0 | 0.01 |
| Calcium | 0 | 0.01 |
| Cerium | 0 | 0.01 |
| Iron/Impurities | Balance | |

ILLUSTRATIVE EXAMPLES

Using the materials simulation software JMatPro® (available from Sente Software Ltd.), three Example compositions within the scope of the present disclosure were analyzed for their phase constituency across a temperature range from 600° C. to 1500° C. Each Example composition includes a varied amount of the major alloying elements Cr, Ni, and Mn, whereas the remaining constituents (Nb, Si, C, N) were included in each Example at their preferred compositional amount, and the impurities (S, P) were minimized to a practical amount for industrial manufacturing. The elemental composition of Examples 1-3 is set forth in TABLE 3, below.

TABLE 3

Compositions of the Illustrative Examples

| Elements | Example 1 (Wt.-%) | Example 2 (Wt.-%) | Example 3 (Wt.-%) |
| --- | --- | --- | --- |
| Chromium | 24 | 25 | 26 |
| Nickel | 11 | 12 | 13 |
| Manganese | 4.5 | 5.0 | 5.5 |
| Niobium | 1.4 | 1.4 | 1.4 |
| Silicon | 1.5 | 1.5 | 1.5 |
| Carbon | 0.45 | 0.45 | 0.45 |
| Nitrogen | 0.30 | 0.30 | 0.30 |
| Sulphur | 0.01 | 0.01 | 0.01 |
| Phosphorous | 0.001 | 0.001 | 0.001 |
| Iron/Impurities | | Balance | |

Figure 2:
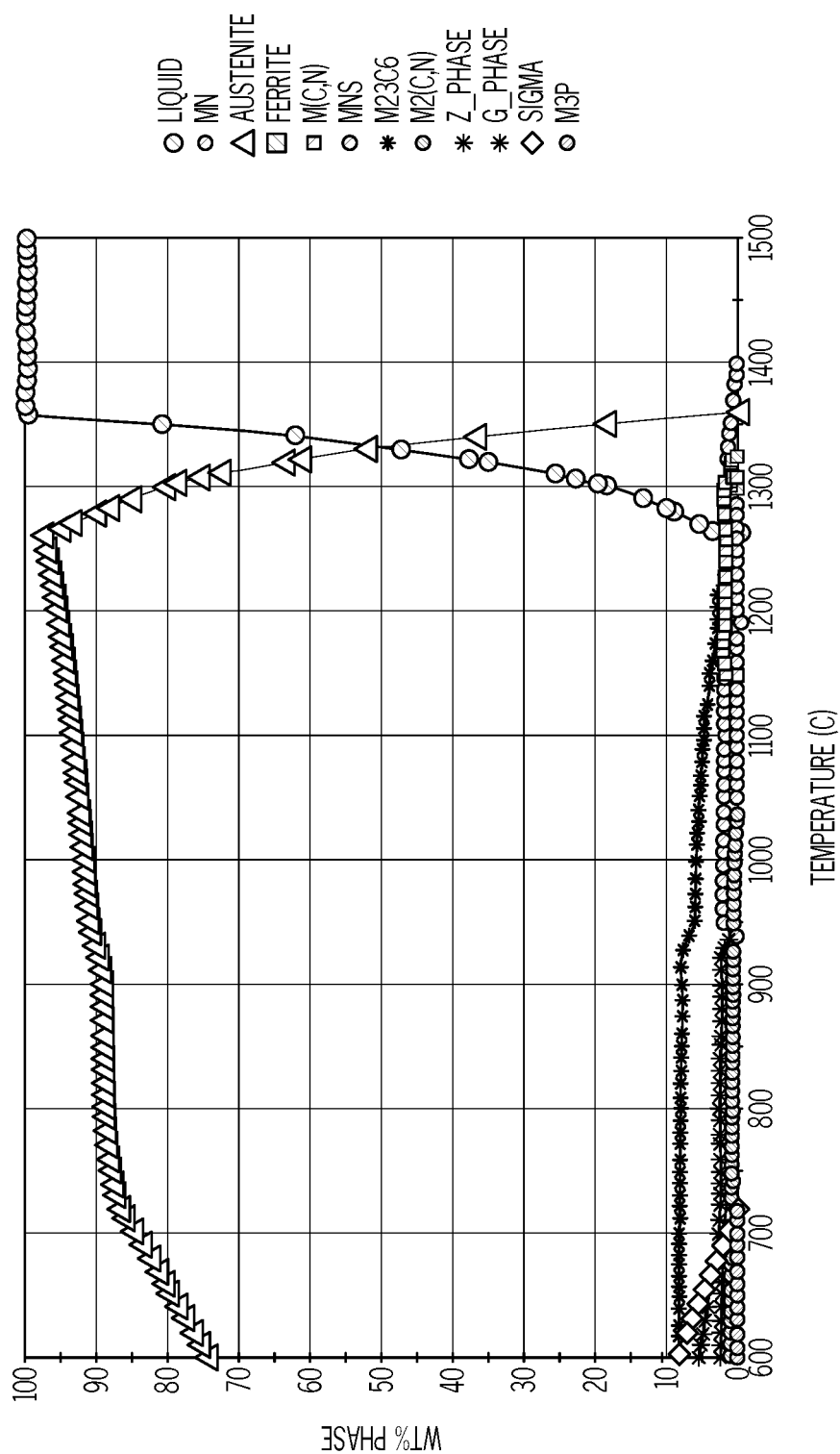
FIG. 2 is a phase composition diagram of one alloy in accordance with an exemplary embodiment of the present disclosure.
Figure 3:
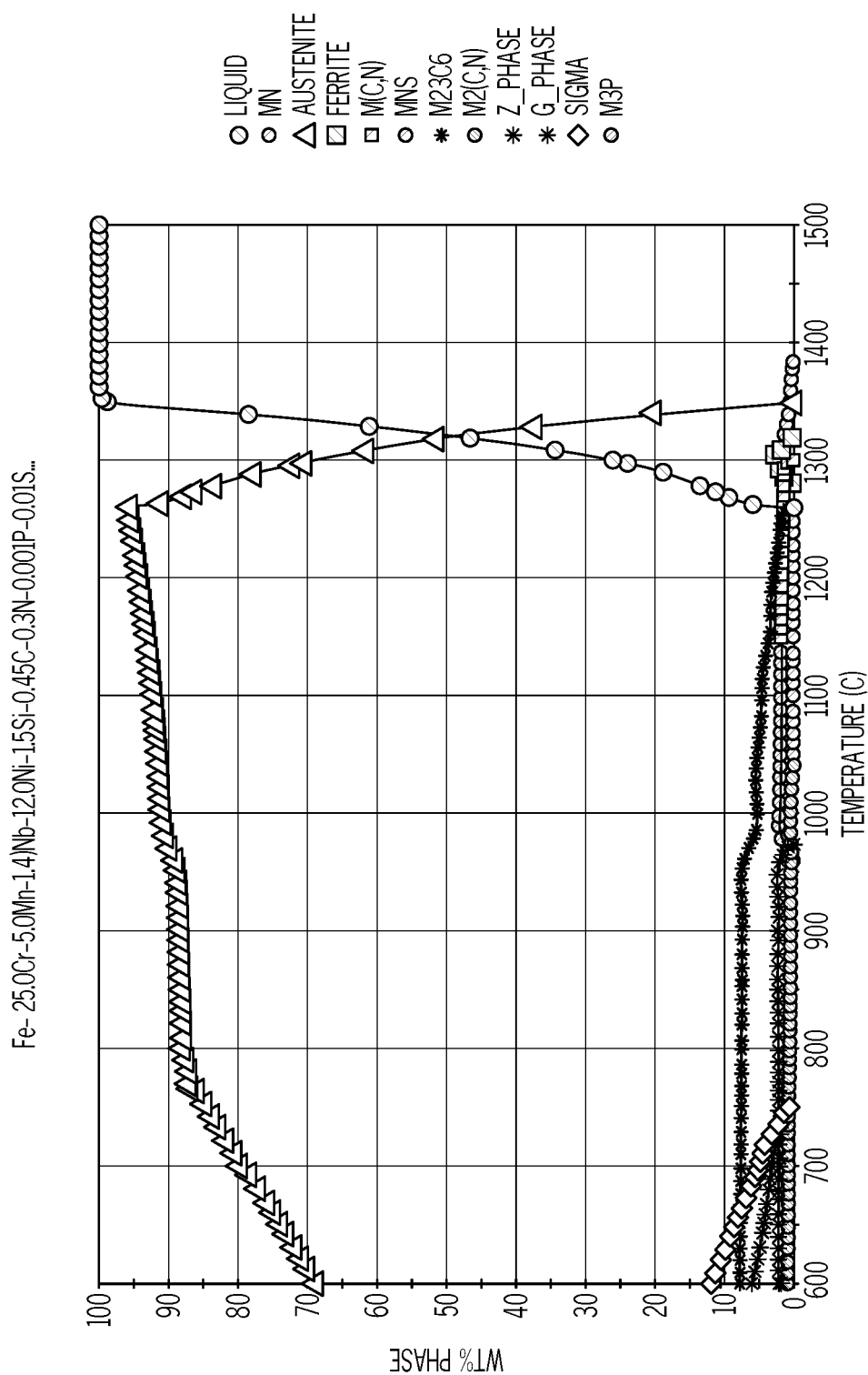
FIG. 3 is a phase composition diagram of another alloy in accordance with a further exemplary embodiment of the present disclosure.
Figure 4:
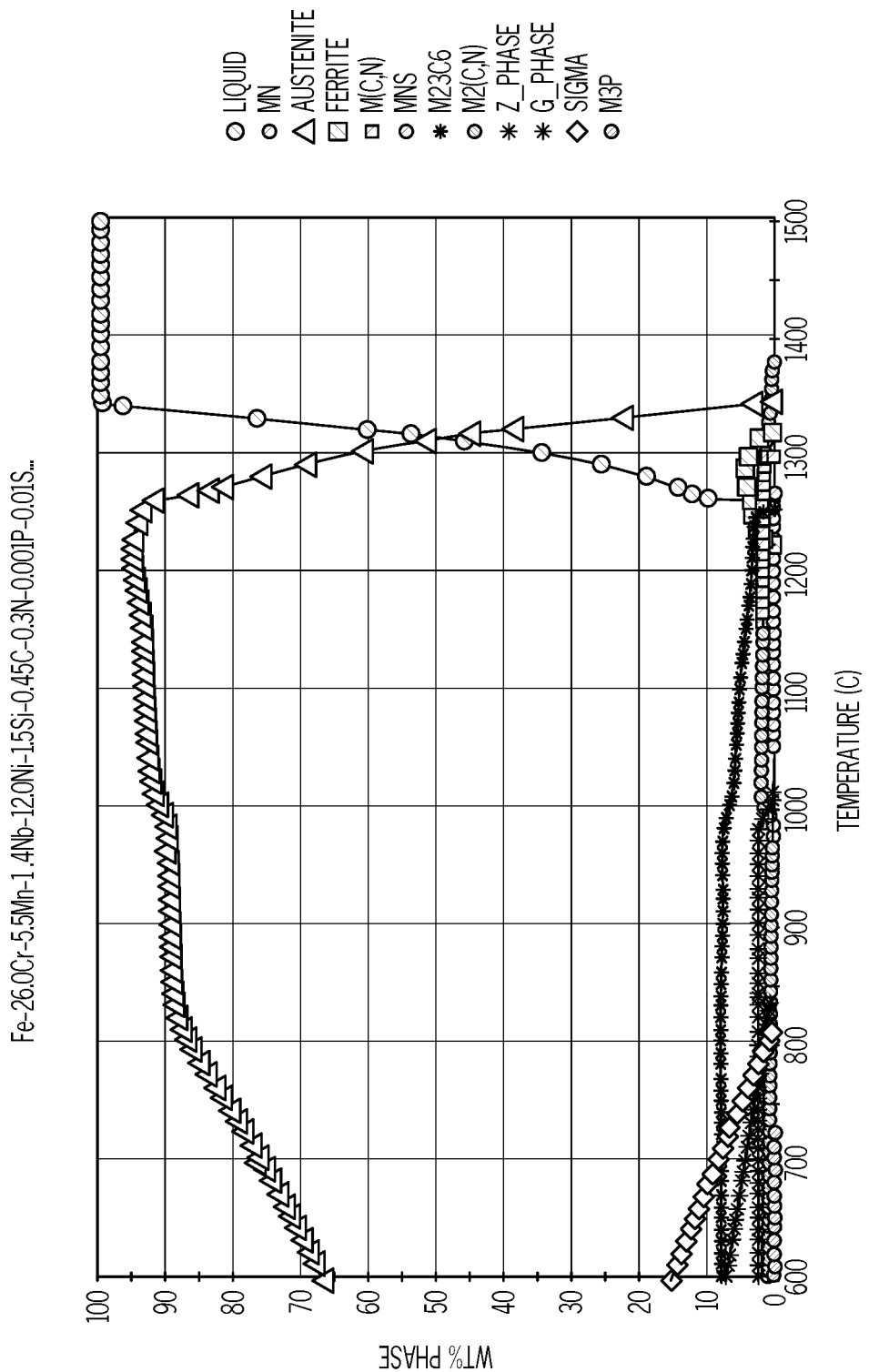
FIG. 4 is a phase composition diagram of yet another alloy in accordance with a still further exemplary embodiment of the present disclosure.

FIG. 2 illustrates the phase composition diagram for Example 1. FIG. 3 illustrates the phase composition diagram for Example 2. Furthermore, FIG. 4 illustrates the phase composition diagram from Example 3. As can be seen in each of FIGS. 2-4, the austenite phase predominates and remains stable up to about 1250° C. The detrimental sigma phase is substantially minimized in each Example. Moreover, the detrimental ferrite phase is substantially minimized below about 1250° C. in each Example. Accordingly, FIGS. 2-4 demonstrate the stability and beneficial phase composition of alloys across the entire disclosed elemental composition ranges described within the present disclosure.

As such, embodiments of the present disclosure provide numerous benefits over the prior art, including the minimization of expensive nickel content, while maintaining desirable material properties for use as turbocharger turbine components, such as housing components or exhaust components. Thus, embodiments of the present disclosure are suitable as a lower cost alloy for turbocharger turbine materials for operation up to about 1050° C.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An austenitic stainless steel alloy, comprising, by weight:
   about 24% to about 26% chromium;
   about 11% to about 13% nickel;
   about 4.5% to about 5.5% manganese;
   about 1.3% to about 1.7% silicon;
   about 1.2% to about 1.6% niobium;
   about 0.40% to about 0.50% carbon;
   about 0.2% to about 0.4% nitrogen; and
   a balance of iron with inevitable/unavoidable impurities, wherein the elements vanadium, tungsten, and molybdenum are excluded beyond impurity levels.

2. The austenitic stainless steel alloy of claim 1 comprising about 24.5% to about 25.5% chromium.

3. The austenitic stainless steel alloy of claim 1 comprising about 11.5% to about 12.5% nickel.

4. The austenitic stainless steel alloy of claim 1 comprising about 4.8% to about 5.2% manganese.

5. The austenitic stainless steel alloy of claim 1 comprising about 1.4% to about 1.6% silicon.

6. The austenitic stainless steel alloy of claim 1 comprising about 1.3% to about 1.5% niobium.

7. The austenitic stainless steel alloy of claim 1 comprising about 0.43% to about 0.47% carbon.

8. The austenitic stainless steel alloy of claim 1 comprising about 0.25% to about 0.35% nitrogen.

9. The austenitic stainless steel alloy of claim 1, consisting of, by weight:
   about 24% to about 26% chromium;
   about 11% to about 13% nickel;
   about 4.5% to about 5.5% manganese;
   about 1.3% to about 1.7% silicon;
   about 1.2% to about 1.6% niobium;
   about 0.40% to about 0.50% carbon;
   about 0.2% to about 0.4% nitrogen; and
   a balance of iron with inevitable / unavoidable impurities.

10. The austenitic stainless steel alloy of claim 1, consisting of, by weight:
    about 24.5% to about 25.5% chromium;
    about 11.5% to about 12.5% nickel;
    about 4.8% to about 5.2% manganese;
    about 1.4% to about 1.6% silicon;
    about 1.3% to about 1.5% niobium;
    about 0.43% to about 0.47% carbon;
    about 0.25% to about 0.35% nitrogen; and
    a balance of iron with inevitable/unavoidable impurities.

11. A turbocharger turbine component comprising:
    an austenitic stainless steel alloy, wherein the austenitic stainless steel alloy comprises, by weight:
    about 24% to about 26% chromium;
    about 11% to about 13% nickel;
    about 4.5% to about 5.5% manganese;
    about 1.3% to about 1.7% silicon;
    about 1.2% to about 1.6% niobium;
    about 0.40% to about 0.50% carbon;
    about 0.2% to about 0.4% nitrogen; and
    a balance of iron with inevitable/unavoidable impurities, wherein the elements vanadium, tungsten, and molybdenum are excluded beyond impurity levels.

12. The turbocharger turbine component of claim 11 comprising about 24.5% to about 25.5% chromium.

13. The turbocharger turbine component of claim 11 comprising about 11.5% to about 12.5% nickel.

14. The turbocharger turbine component of claim 11 comprising about 4.8% to about 5.2% manganese.

15. The turbocharger turbine component of claim 11, wherein the austenitic stainless steel alloy consists of, by weight:
    about 24% to about 26% chromium;
    about 11% to about 13% nickel;
    about 4.5% to about 5.5% manganese;
    about 1.3% to about 1.7% silicon;
    about 1.2% to about 1.6% niobium;
    about 0.40% to about 0.50% carbon;
    about 0.2% to about 0.4% nitrogen; and
    a balance of iron with inevitable/unavoidable impurities.

16. The turbocharger turbine component of claim 11, wherein the austenitic stainless steel alloy consists of, by weight:
    about 24.5% to about 25.5% chromium;
    about 11.5% to about 12.5% nickel;
    about 4.8% to about 5.2% manganese;
    about 1.4% to about 1.6% silicon;
    about 1.3% to about 1.5% niobium;
    about 0.43% to about 0.47% carbon;
    about 0.25% to about 0.35% nitrogen; and
    a balance of iron with inevitable/unavoidable impurities.

17. The turbocharger turbine component of claim 11, wherein the component comprises a turbine housing or a turbine exhaust component.

18. A method of fabricating a turbocharger turbine housing, the method comprising the step of:
    forming the turbocharger turbine housing from an austenitic stainless steel alloy, wherein the austenitic stainless steel alloy comprises, by weight:
    about 24% to about 26% chromium;
    about 11% to about 13% nickel;
    about 4.5% to about 5.5% manganese;
    about 1.3% to about 1.7% silicon;
    about 1.2% to about 1.6% niobium;
    about 0.40% to about 0.50% carbon;
    about 0.2% to about 0.4% nitrogen; and
    a balance of iron with inevitable/unavoidable impurities, wherein the elements vanadium, tungsten, and molybdenum are excluded beyond impurity levels..

19. The method of claim 18, wherein the austenitic stainless steel alloy consists of, by weight:
    about 24% to about 26% chromium;
    about 11% to about 13% nickel;
    about 4.5% to about 5.5% manganese;
    about 1.3% to about 1.7% silicon;
    about 1.2% to about 1.6% niobium;
    about 0.40% to about 0.50% carbon;
    about 0.2% to about 0.4% nitrogen; and
    a balance of iron with inevitable/unavoidable impurities.

20. The method of claim 18, wherein the austenitic stainless steel alloy consists of, by weight:
    about 24.5% to about 25.5% chromium;

about 11.5% to about 12.5% nickel;
about 4.8% to about 5.2% manganese;
about 1.4% to about 1.6% silicon;
about 1.3% to about 1.5% niobium;
about 0.43% to about 0.47% carbon;
about 0.25% to about 0.35% nitrogen; and
a balance of iron with inevitable/unavoidable impurities.

\* \* \* \* \*